Oct. 31, 1961  R. C. SCHUBERT  3,006,692
VEHICLE WHEEL

Filed June 4, 1958  2 Sheets-Sheet 1

R.C. SCHUBERT
INVENTOR.

BY E. C. McRae
J. R. Faulkner
J. H. Oster

ATTORNEYS

Oct. 31, 1961     R. C. SCHUBERT     3,006,692
VEHICLE WHEEL

Filed June 4, 1958     2 Sheets-Sheet 2

R.C. SCHUBERT
INVENTOR.

BY E.C. McRae
J.R. Faulkner
J.H. Oster

ATTORNEYS

United States Patent Office  3,006,692
Patented Oct. 31, 1961

3,006,692
VEHICLE WHEEL
Richard C. Schubert, Lincoln Park, Mich., assignor to Ford Motor Company, Dearborn, Mich., a corporation of Delaware
Filed June 4, 1958, Ser. No. 739,707
1 Claim. (Cl. 301—63)

This invention relates to a vehicle wheel having a demountable flange rim.

An object of the present invention is to provide a vehicle wheel having a flat based demountable flange rim incorporating improved means for interlocking the two sections of the rim together. The wheel provides improved brake clearance and simplified tire mounting, and makes possible the elimination of the spare wheel. The wheel also incorporates sealing means enabling the wheel to be used with tubeless tires. Another feature of the wheel is the incorporation of safety means preventing inadvertent disengagement of the rim sections and possible personal injury when the tire is being inflated.

Other objects and advantages of this invention will be made more apparent as this description proceeds, particularly when considered in connection with the accompanying drawings, wherein.

Figure 1:
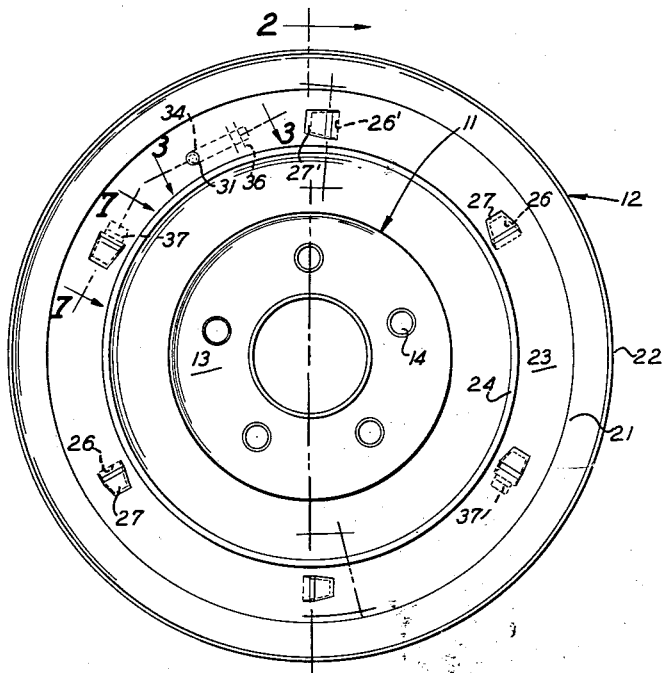
FIGURE 1 is a side elevational view of a wheel incorporating the present invention.

FIGURES 4 to 7 inclusive are sections on the line 7—7 of FIGURE 1 showing four successive steps during the assembling of the rim sections to each other.

Figure 2:
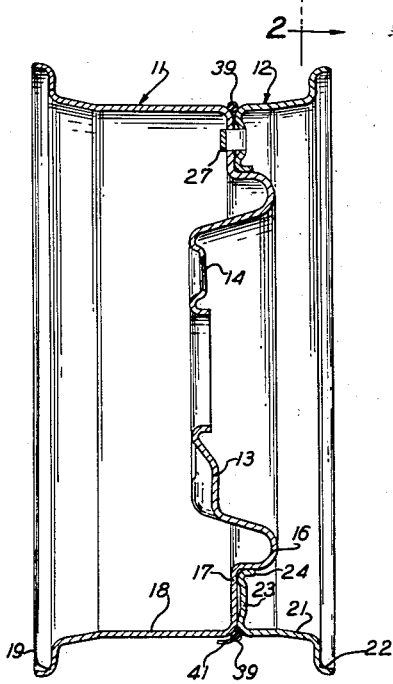
FIGURE 2 is a section on the line 2—2 of FIGURE 1.

Referring now to the drawings, and particularly to FIGURE 2, the vehicle wheel includes an integral rim and spider 11 and a demountable rim flange 12. The integral rim and spider 11 has a bolt-on flange 13 formed with a series of bolt holes 14 for conventionally attaching the wheel to a wheel hub. Radially outwardly from the bolt-on flange 13 the spider 11 is formed with an intermediate annular ribbed portion 16 and an outer radially extending flat web portion 17. The web 17 merges into a flat rim base 18 formed with a tire retaining flange 19 at its outer edge.

The demountable rim flange 12 has a flat rim base 21 forming a continuation of the rim base 18 and also provided with a tire retaining flange 22 at its edge. Integrally formed with the rim base 21 is a generally radially extending web 23 and an inner annular locating flange 24. The locating flange 24 engages the shoulder formed by the annular ribbed portion 16 of the spider to locate the demountable rim flange and to support it in its assembled position with respect to the integral rim and spider 11.

The web 23 of the demountable rim flange 12 is positioned adjacent the web 17 of the spider, and the central portion of the web 23 is slightly offset to provide two radially spaced annular zones of contact between the two webs.

Figure 7:
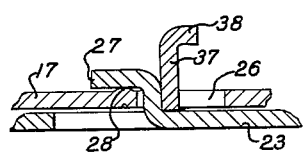

The web 17 of the spider is formed with six angularly spaced generally rectangular openings 26. With reference to FIGURE 1, it will be noted that the sides of the openings converge slightly, and that the six openings are equally angularly spaced with respect to each other with the exception of the opening 26', which is offset a few degrees from a position equally spaced from the adjoining openings, for a purpose to be discussed later. A series of six correspondingly spaced locking tabs 27 are struck out from the web 23 of the demountable rim flange 12, and are shaped similarly to the openings 26 but slightly smaller to enable them to be inserted through the openings. It will be also noted that the tabs 27 are offset from the plane of the web 23 so that they can overlap the adjoining portions of the web 17 of the spider to lock the two rim sections together, as shown in FIGURE 7. When thus assembled, the tabs 27 engage a rib 28 formed on the web 17 of the spider to provide an accurate locating means for locking the two rim sections in their proper relationship.

Figure 3:
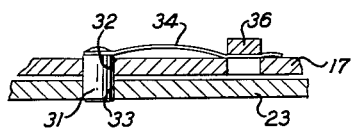
FIGURE 3 is a section on the line 3—3 of FIGURE 1.

Referring now to FIGURES 1 and 3, the reference character 31 indicates a locking pin adapted to be received by aligned holes 32 and 33 in the webs 17 and 23 respectively, to prevent relative rotation between the rim sections when the wheel is assembled. The locking pin 31 is riveted to the end of a flat spring 34, the latter being attached to the web 17 of the spider by being inserted beneath a loop 36 struck out from the web.

Safety hooks 37 are welded to the web 23 of the demountable rim flange 12 adjacent certain of the locking tabs 27. In the present embodiment two safety hooks 37 are provided diametrically opposite from each other. The hooks extend generally axially, and have integral flanges 38 formed at their outer ends.

The assembly of the demountable rim flange 12 to the integral rim and spider 11 will now be described, with particular reference being made to the steps shown in FIGURES 4 to 7 inclusive.

The first step is to position the demountable rim flange 12 with the locking tabs 27 generally in alignment with the openings 26 in the web 17 of the spider. It will be seen that the offset relationship of the opening 26' and tab 27', with respect to the otherwise equally spaced openings 26 and tabs 27, insures proper relationship between the demountable rim flange and the integral rim and spider to enable the locking pin 31 to be dropped into locking position in the holes 32 and 33 when the assembly is completed.

Figure 4:
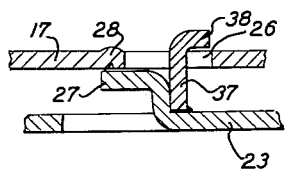
Figure 5:
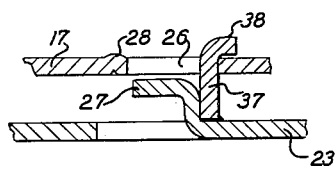
Figure 6:
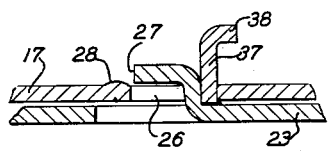

With reference now to FIGURE 4, the flanged ends 38 of the two safety hooks 37 are first inserted through the corresponding openings 26. Next, as seen in FIGURE 5, the demountable rim flange 12 is rotated until the flanged end 38 of each safety hook overlaps the spider web 17, bringing the locking tabs 27 into alignment with the openings 26. Subsequent axial movement of the demountable rim flange 12 toward the integral rim and spider 11 moves the locking tabs 27 through the openings 26, as shown in FIGURE 6. The final assembly step is to rotate the demountable rim flange 12 in the opposite direction, moving the locking tabs 27 over the locating ribs 28 on the spider web 17 until the locking pin 31 drops into position in the aligned holes 32 and 33 in the webs 17 and 23 respectively.

The final assembled position is thus shown in FIGURE 7, and it will be noted that the demountable rim flange 12 is effectively held against disassembly from the integral rim and spider 11 until the locking pin 31 is released and the above series of assembly steps reversed. When used with a tubeless type tire, a resilient sealing ring 39 is provided to form an air tight seal between the demountable rim flange 12 and the integral rim and spider 11. In the present instance, the sealing ring 39 is of circular cross section, but it may be of any other desired section. The ring is endless and is so designed as to require considerable stretching to assemble it to the wheel rim. It may, for example, be stretched to twice its free length to provide sufficient tension to insure proper sealing between the rim bases 18 and 21. The sealing ring 39 may be provided at one point with a tab 41 to assist in removing the sealing ring.

The safety hooks 37 guard against inadvertent disengagement of the demountable rim flange 12 from the wheel when the tire is being inflated. This might happen if for some reason the locking pin 31 were not properly engaged in the holes 32 and 33, thus permitting rotation of the demountable rim flange 12 relative to the integral rim and spider 11. It will be seen, however, that even with such relative rotation to the position shown in FIGURE 6 in which the tabs 27 are in alignment with the openings 26, disengagement of the demountable rim flange 12 is prevented by reason of the overlapping of the flanged ends 38 of the safety hooks 37 with respect to the web 17 of the spider. Tire pressure might cause axial movement of the demountable rim flange 12 relative to the wheel to the position shown in FIGURE 5, but at this time the webs 17 and 23 would be sufficiently separated to permit the escape of air and the deflation of the tire. An important safety feature is thus provided.

The construction shown enables a larger diameter brake to be used with a given wheel size due to the flat base of the rim. The flat base likewise prevents the tire from leaving the wheel during a blowout, and also prevents inadvertent deflation of the tire should one tire bead be temporarily axially moved by engagement with a curb or other obstruction. The demountable rim flange 12 may be readily removed with the special tools, and eliminates the need for a spare wheel for the spare tire.

It will be understood that the invention is not to be limited to the exact construction shown and described, but that various changes and modifications may be made without departing from the spirit and scope of the invention, as defined in the appended claims.

What is claimed is:

A bipartite sheet metal vehicle wheel having a first part comprising a generally radially extending web and an integral generally axially extending rim, said web having a circumferentially arranged series of bolt holes near its inner edge, an annular axially extending contour in said web radially outwardly of said bolt holes, a second part comprising a demountable flange having a generally radially extending web positioned adjacent said first mentioned web and having a generally axially extending rim forming a continuation of said first mentioned rim, said second web having an axial cylindrical flange formed on its inner edge positioned concentrically about said annular contour, a series of angularly spaced apertures in one of said webs, a corresponding series of angularly spaced circumferentially extending locking tabs on the other of said webs, said locking tabs being offset axially from the plane of said other web and generally parallel thereto, locking means between said webs operative when said webs have rotated to interlocked relationship to prevent subsequent rotation between said first and second parts, said locking means comprising a pair of aligned holes in said webs and spring pressed means positioned through said holes, safety members extending axially from a plurality of said locking tabs through the apertures in said one web and having flanged ends extending in a circumferential direction opposite to said locking tabs, said safety members being arranged to overlap said one web when the locking tabs are in alignment with their corresponding apertures to prevent inadvertent disengagement between said first and second parts.

References Cited in the file of this patent

UNITED STATES PATENTS

| | | |
|---|---|---|
| 1,223,635 | Stinemetts | Apr. 24, 1917 |
| 1,414,594 | Snow | May 2, 1922 |
| 1,579,045 | Westley | Mar. 30, 1926 |
| 2,384,649 | Sinclair | Sept. 11, 1945 |
| 2,433,073 | Terry | Dec. 23, 1947 |
| 2,652,170 | Lotter | Sept. 15, 1953 |
| 2,847,050 | Burke | Aug. 12, 1958 |

FOREIGN PATENTS

| | | |
|---|---|---|
| 240,772 | Great Britain | Oct. 8, 1925 |